United States Patent [19]

Blosser

[11] Patent Number: 5,463,857
[45] Date of Patent: Nov. 7, 1995

[54] DOUBLE KNIFE STUBBEL CUTTER

[76] Inventor: Ken Blosser, Box 743, Kelvington, Saskatchewan, Canada, S0A 1W0

[21] Appl. No.: 352,708

[22] Filed: Dec. 5, 1994

[51] Int. Cl.⁶ ............................ A01D 34/07; A01D 34/30
[52] U.S. Cl. ...................................... 56/238; 56/6; 56/296
[58] Field of Search ........................... 56/6, 121.43, 238, 56/296, 297, 300, 500

[56] References Cited

U.S. PATENT DOCUMENTS

| 829,300 | 8/1906 | Greenshields | 56/238 |
| 2,316,475 | 4/1943 | Viken | 56/238 |
| 2,401,513 | 6/1946 | Schmidt | 56/238 |
| 3,399,517 | 9/1968 | Magee | 56/13.9 |

FOREIGN PATENT DOCUMENTS

1482849  2/1970  Germany ................... 56/238

Primary Examiner—David J. Bagnell
Attorney, Agent, or Firm—Adrian D. Battison; Murray E. Thrift; Stanley G. Ade

[57] ABSTRACT

A double knife stubble cutting machine is provided for cutting stubble after a harvesting action into three separate pieces including a standing stubble piece and two cut pieces. The device comprises a frame having a center section and a pair of wing sections with the wing sections being pivotal about a horizontal axis upwardly to a transport position. The frame defines a tool bar across the full width of the frame which carries a pair of sickle knife support bars downwardly of the tool bar and arranged so that one sickle knife is forwardly of and upwardly of the second sickle knife. Both knives are open and free from support elements between the knives so that the cut material can be discarded back to the ground after cutting without any transverse movement or blockage. The harvesting action therefore allows the minimum amount of straw to be taken by the combine harvester so that the standing stubble element is cut into three pieces of equal length. The space in between the cutter knives is adjusted by twisting the support beam.

15 Claims, 7 Drawing Sheets

DOUBLE KNIFE STUBBEL CUTTER

The invention relates to an apparatus for cutting standing stubble subsequent to a harvesting operation in which the length of straw taken into the harvesting machine is kept to a minimum.

BACKGROUND OF THE INVENTION

In harvesting of a standing crop, it is well known that the efficiency and speed of the combine harvester, when using a straight cut header, or the swather can be improved by reducing the length of the straw cut with the head of the crop. Many farmers have therefore obtained this improvement in efficiency by raising the header above a normal cutting height which provides an increase in speed, more efficient threshing, lower fuel consumption, lower repair bills and a reduction in the likelihood of picking up a rock.

The problem with this technique in harvesting is that the standing stubble left by the combine is of a height greater than can be accommodated by the subsequent cultivation and seeding tools.

Various alternatives are available for handling the standing stubble. One alternative involves using a swather to cut the stubble after the combine has been through the field but this technique leaves windrows of the cut straw which would need to be burnt, which is an unacceptable, unsustainable and environmentally unfriendly way to farm. It is also possible to operate the swather with the canvasses removed to avoid windrowing of the straw. However this does not operate effectively as the straw will not flow over the obstructions incorporated in the conventional design of the swather.

It has been tried simply to work the stubble into the ground through separate tillage operations but due to the length of the stubble this causes plugging of the machine and often leaves lumps or piles of the straw throughout the field.

Yet further techniques available in the industry involve the use of rotary and flail mowers which simply chop the straw into relatively small pieces but these machines are relatively expensive to purchase, require high horse power to drive are relatively slow in operation as they are narrow and have low ground speed capability.

A further proposal which has been set forth in patents but is not commercially available is shown for example in U.S. Pat. No. 2,401,513 (Schmidt) which discloses a second cutter behind the combine header which cuts the straw at or adjacent ground level. U.S. Pat. No. 3,399,517 (Magee) discloses a combine harvester header with two knives at the forward end for use in harvesting a corn crop.

The use of the single cutter bar behind the header cutter bar causes the straw to be cut basically into three pieces. The first upper piece is the piece carrying the head of the crop which is carried into the combine harvester. The remaining standing stubble is then cut only into two pieces, one of which is left standing and attached to the ground and the other of which is cut and discharged onto the ground.

Single sickle knife cutters are available, for example that manufactured by Muchka of Alberta Canada which provides a single knife of only 30 feet in width in a pull behind arrangement which can be used to cut down the standing stubble. However these arrangements are of limited width and again can only cut the stubble into a separated piece and standing piece.

It is generally accepted that straw pieces either standing or cut on the ground should not exceed the shank spacing on the following tillage machine. In many recent tillage machines, 8 inches is the narrowest shank spacing and often it is difficult with the above techniques to obtain straw pieces of less than 8 inches while maximizing the efficiency of the combine harvester.

SUMMARY OF THE INVENTION

It is one aspect of the present invention, therefore, to provide an improved stubble cutter which allows the stubble to be cut to the required length while maximizing the efficiency of operation of the combine harvester.

According to the invention, therefore, there is provided an apparatus for cutting stubble comprising a frame having a width defining a working width of the apparatus, a plurality of ground wheels for supporting the frame in movement across ground carrying standing stubble to be cut, a hitch attached to the frame for applying a pulling force from a towing vehicle to the frame in a direction of working movement at right angles to the working width, a first sickle knife, a second sickle, a means mounting each of the first and second sickle knives on the frame so that each extends across the full working width, said mounting means mounting the first sickle knife upwardly of and forwardly of the second sickle such that the first sickle knife cuts a first upper stubble piece from the standing stubble as the frame is moved forwardly in the working direction and the second sickle knife cuts a second lower stubble piece from the standing stubble leaving a lower most standing piece, the frame defining an open area behind each of said first and second sickle knives arranged such that the upper stubble and the lower stubble piece fall to the ground behind the first and second sickle knives through the open areas at a position substantially aligned on the ground with the standing stubble piece.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

The apparatus shown in FIGS. 1 through 11 comprises generally a hitch section 10 having a hitch coupling 11 for attachment to a tractor vehicle. The apparatus further includes a frame generally indicated at 12 having a center section 13 and 2 wing sections 14 and 15. Each of the sections of the frame includes a main beam with a center section 13 having a main beam 16 and each of the wing sections having a main beam 17 and 18 respectively. The main beam 16 is connected to a parallel supplementary beam 20 by a plurality of forward extending struts 21 thus forming a rectangular frame lying in a common plane.

Each of the wing sections 14 and 15 includes a single strut 22 and a diagonal connecting strut 23. The outer end of the main beam 16 includes a pair hinge couplings 24 each of which engages and couples to an inner end of a respective one of the main beams 17 and 18 of the wing sections. Similarly the supplementary beam 20 is connected by pivot couplings 25 to an inner, forward end of the diagonal strut 23. The hinge couplings 24 and 25 lay on a common line 26 which is substantially horizontal and co-planar with the plane of the center section frame 13.

The hitch 10 is generally of A-frame shape including a pair of diagonal hitch rails 27 which are connected at their rear ends to the supplementary beam 20 at a hinge coupling 28. The hinge couplings 28 define a horizontal pivot axis 29 again co-planar with the plane of the center section frame 13 and at right angles to the axis 26.

Figure 6:
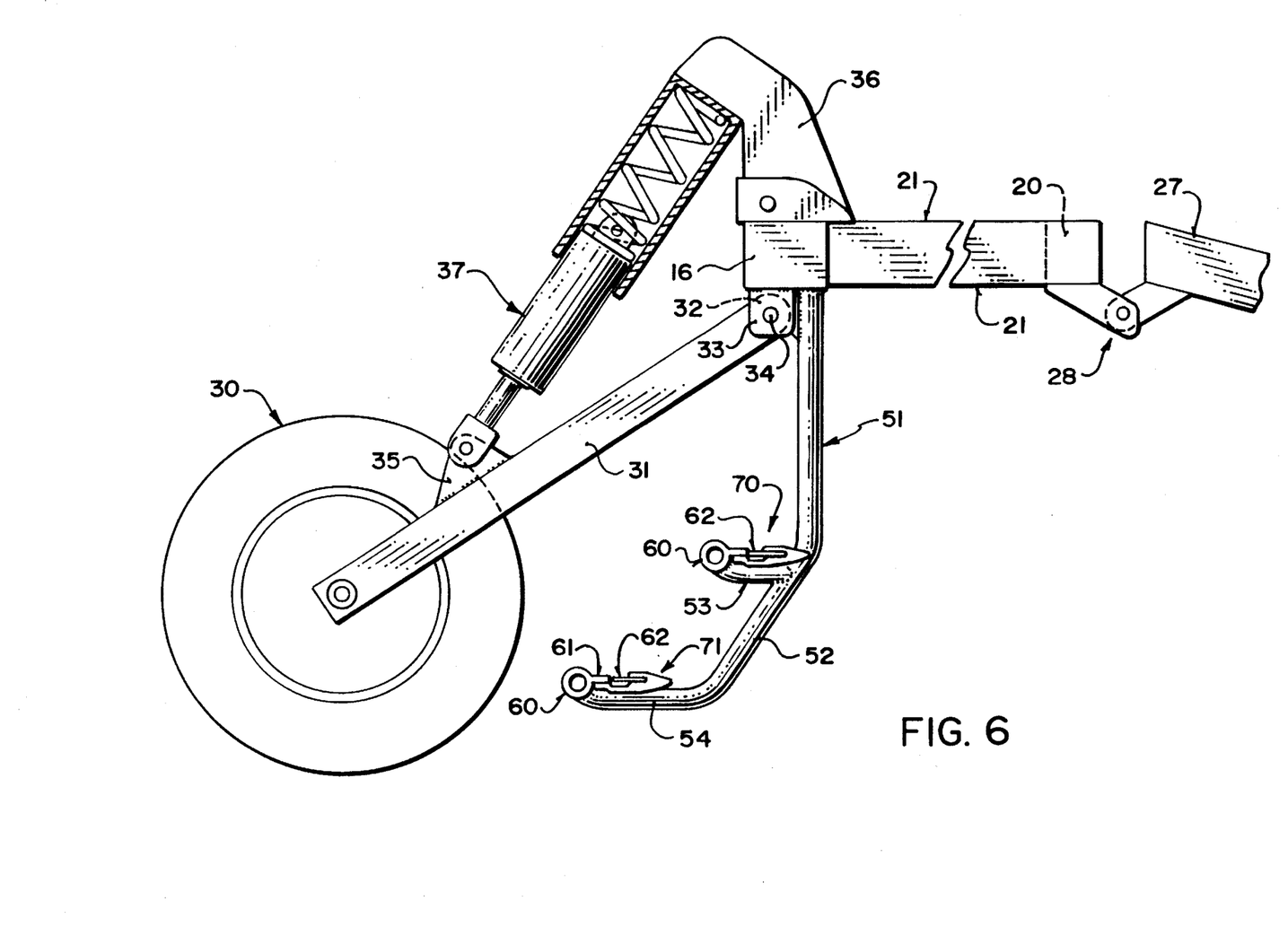
FIG. 6 is a side elevational view similar to FIG. 5 on an enlarged scale showing the ground wheel in a raised position to lower the sickle knives to a position close to the ground.

As best shown in FIG. 6, the main beam 16 of the center section is carried on a pair of ground wheels 30. Each ground wheel 30 is attached to a strut 31 which extends from the trailing ground wheel forwardly and upwardly to a bracket 32 bolted by a pair of flanges 33 to an underside of the main beam 16. The bracket 32 provides a pivot pin 34 which allows adjustment movement of the strut 31 around the pivot pin 34. The strut carries a lug 35 on its upper surface. The main beam 16 carries an upstanding flange 36 on its upper surface and the lug 35 and the flange 36 cooperate to receive a hydraulic cylinder 37 therebetween for adjustment of the angle of the strut 31 around the pivot pin. It being appreciated that this adjustment movement actuated by the cylinder 37 tends to raise and lower the main beam 16 relative to the ground.

Similarly each of the wing sections is mounted on a ground wheel 40 having a support arrangement relative to the main beam sections 17 and 18 substantially identical to that shown in FIG. 6. Thus the main beam of the frame is carried on the four ground wheels 30 and 40 at a height which is adjustable by common actuation of the cylinders 37 by a control system (not shown).

Figure 9:
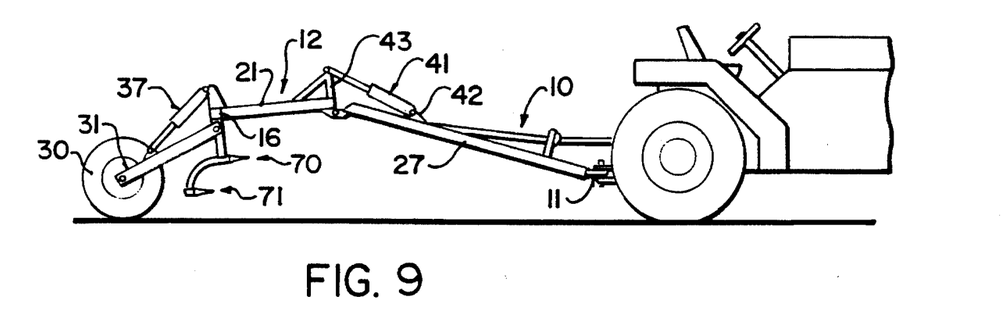
FIG. 9 is a side elevational view of the apparatus attached to a towing vehicle showing the adjustment of the height and orientation of the sickle knives to an initial or normal position.
Figure 10:
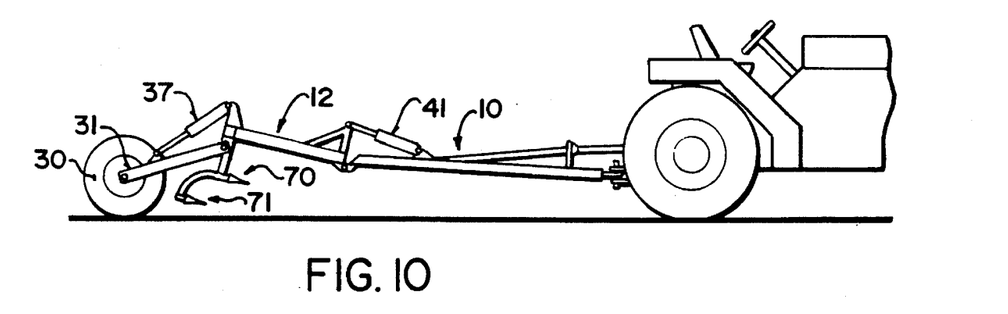
FIG. 10 is a view similar to that of FIG. 9 showing the apparatus adjusted to reduce the spacing between the point of cut of the sickle knives.
Figure 11:
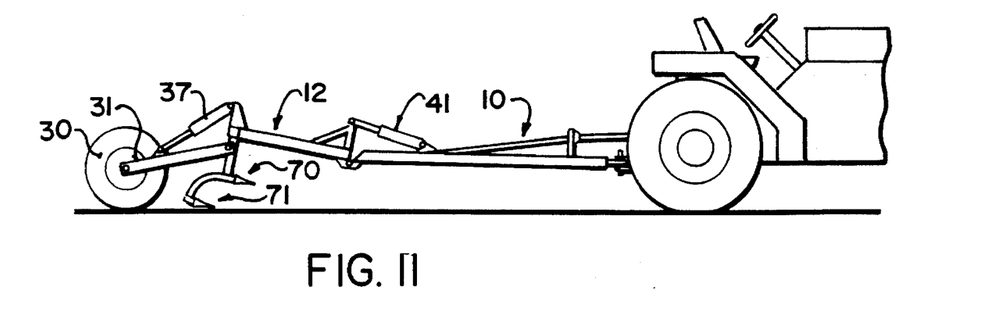
FIG. 11 is a further view similar to FIGS. 9 and 10 showing the knives lowered to a position closer to the ground.

The orientation of the frame can also be adjusted by operating a hydraulic cylinder 41 connected between a bracket 42 on the hitch rail 27 and a strut 43 at a forward end of the frame on the beam 21. As shown in FIGS. 9, 10 and 11, therefore, the adjustment of the angle between the hitch frame 10 and the center section 13 of the frame and also the adjustment of the angle of the strut 31 causes the main beam 16 to be raised and lowered and also to be rotated about a horizontal axis parallel to the main beam. As the wing frame sections are connected to the center section by the hinge couplings 24 and 25, the whole of the frame including the beam 17 and 18 of the wings sections move commonly with the beam 16.

Figure 2:
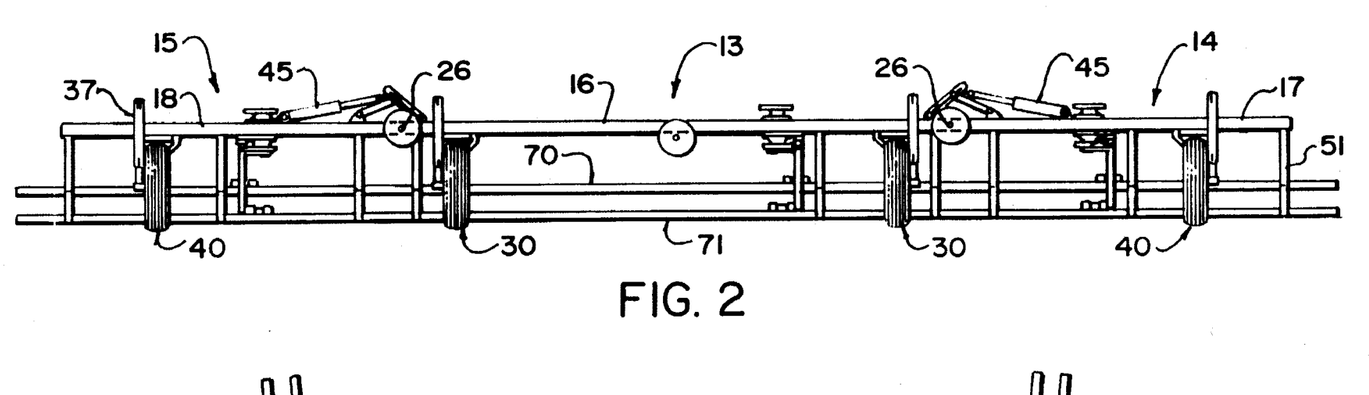
FIG. 2 is a rear elevational view of the apparatus of FIG. 1.
Figure 3:
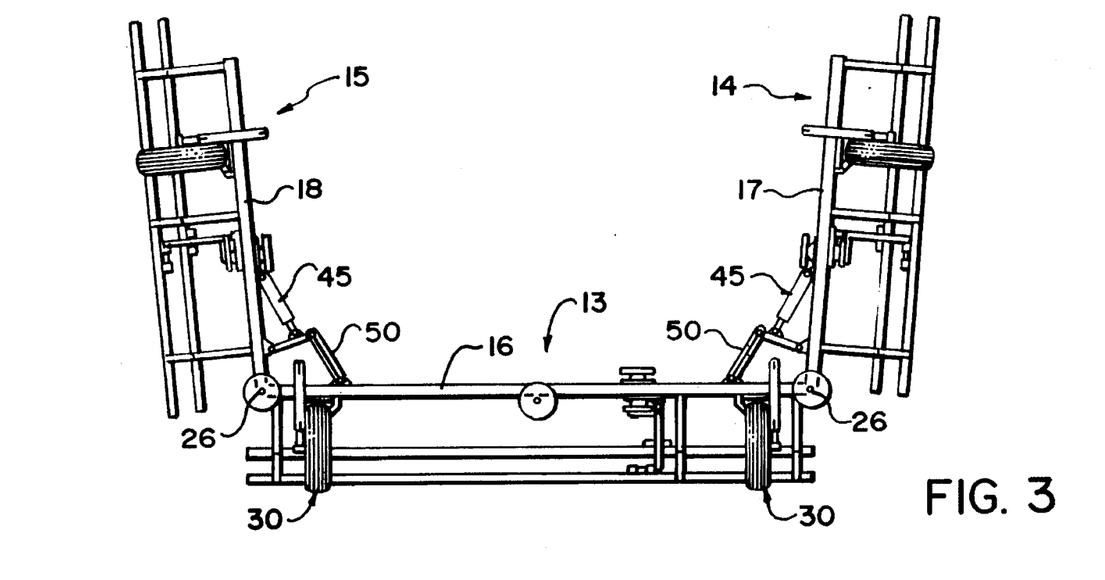
FIG. 3 is a rear elevational view of the apparatus of FIG. 1 showing the wing sections in the raised position for transport.
Figure 4:
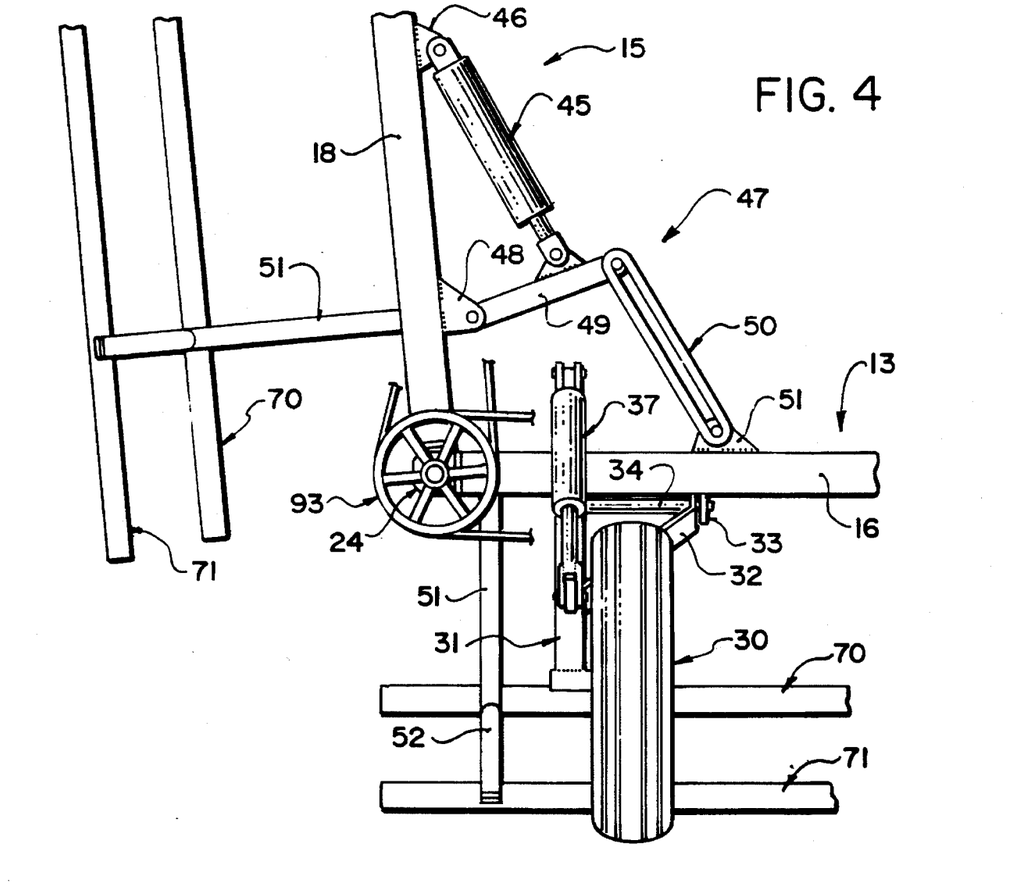
FIG. 4 is a rear elevational view of a part only of the apparatus in a position shown in FIG. 3.

The wing sections as best shown in FIGS. 2, 3 and 4 can be moved from the initial working position shown in FIG. 2 to a transport position shown in FIG. 3. This movement is effected by a hydraulic cylinder 45 which operates between a bracket 46 on the beam 18 and a coupling system 47 connected between the beam 18 and the 16. The coupling system 47 includes a bracket 48 mounted on the beam 18, a first lever 49 and a second lever 50 mounted on a bracket 51 carried on the beam 16. An outer end of the lever 49 can slide within a slot in the lever 50. In an extended position of the cylinder 45, the lever 49 is moved partly along the slot in the lever and in a working position this allows the wing frame section to move upwardly and downwardly by pivotal movement about the axis 26 while the lever 49 slides in the slot of the lever 50 to accommodate that movement. However when it is required to raise the wing section to the transport position, the cylinder 45 is retracted pulling the lever 49 toward the beam 18. This moves the lever 49 to the end of the lever 50 and then acts to pull the beam 18 about the axis 26 to a raised position generally vertically above the axis 26.

The main beam formed by the sections 16, 17 and 18 supports the double knife arrangement which provide the cutting action on the stubble. This construction is best shown in FIG. 6 which shows the preferred arrangement for support of the sickle knives. Other drawings show the support arrangement only schematically for convenience of illustration. Thus in FIG. 6 the beam 16 carries a plurality of downwardly extending legs 51 at spaced positions along the length of the beam. Each leg 51 has a first vertical portion and a second rearwardly and downwardly inclined portion 52 at a lower end of the vertical portion. At an upper end of the inclined portion is provided a rearwardly extending strut 53. At a bottom end of the inclined portion is a similar rearwardly extending strut 54. Each of the struts 53 and 54 carries at its rearward end a tubular beam 60.

It will be noted that each sickle knife comprises the tubular beam 60 with a welded flat plate 61 on a forward face thereof. The flat plate 61 carries a conventional sickle knife assembly 62 with a plurality of knife guards 63 and a reciprocating knife assembly 64. The knife assembly includes an elongate strap 65 which slides back and forth in a drive slot defined by a back plate 66.

In FIG. 6 for convenience illustration the drive mechanism is omitted. In FIG. 8 part of the drive mechanism is shown but for convenience illustration the second sickle knife is omitted. The drive mechanism is shown in more detail in FIG. 7.

Figure 5:
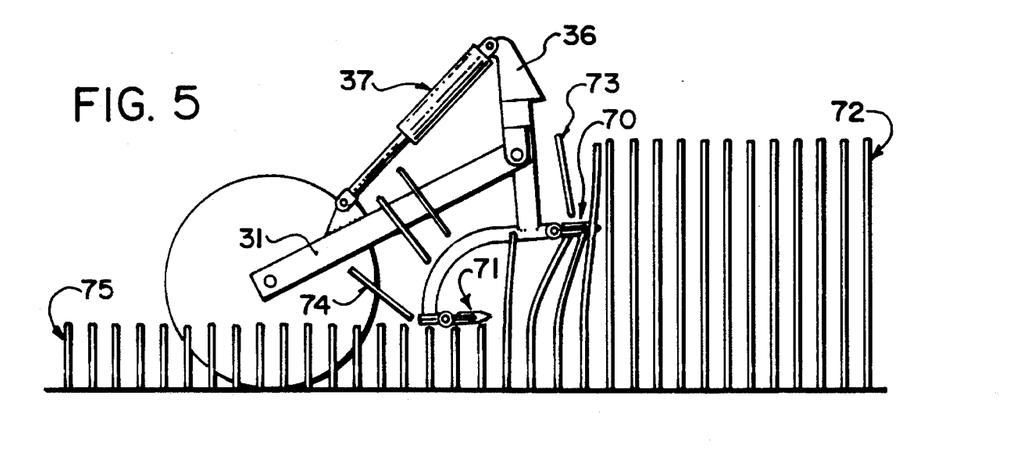
FIG. 5 is an end elevational view of the apparatus of FIG. 1 showing the operation of the sickle knives on the crop.

Referring firstly to FIGS. 5 and 6, there will be noted therefore that the beam 16 carries on the legs 51 two sickle knives including a first sickle knife 70 and a second sickle knife 71. The first sickle knife 70 is arranged upwardly of and forwardly of the second sickle knife so that, as shown in FIG. 5, the first sickle knife acts upon an upper part of a standing stubble row 72 and the second sickle knife acts upon a lower part of the same stubble. In the cutting action, therefore, the first sickle knife 70 engages an upper part of the stubble to cut away an upper stubble piece 73 which is released from the cutter knife and travels rearwardly to fall to the ground behind the cutter system. The second cutter knife 71 cuts a second lower piece 74 which similarly moves upwardly and rearwardly from the cutter knife to fall to the ground behind the cutter system. The second cutter knife 71 is spaced upwardly from the ground so as to leave a third stubble piece 75 remaining standing on the ground.

Figure 1:
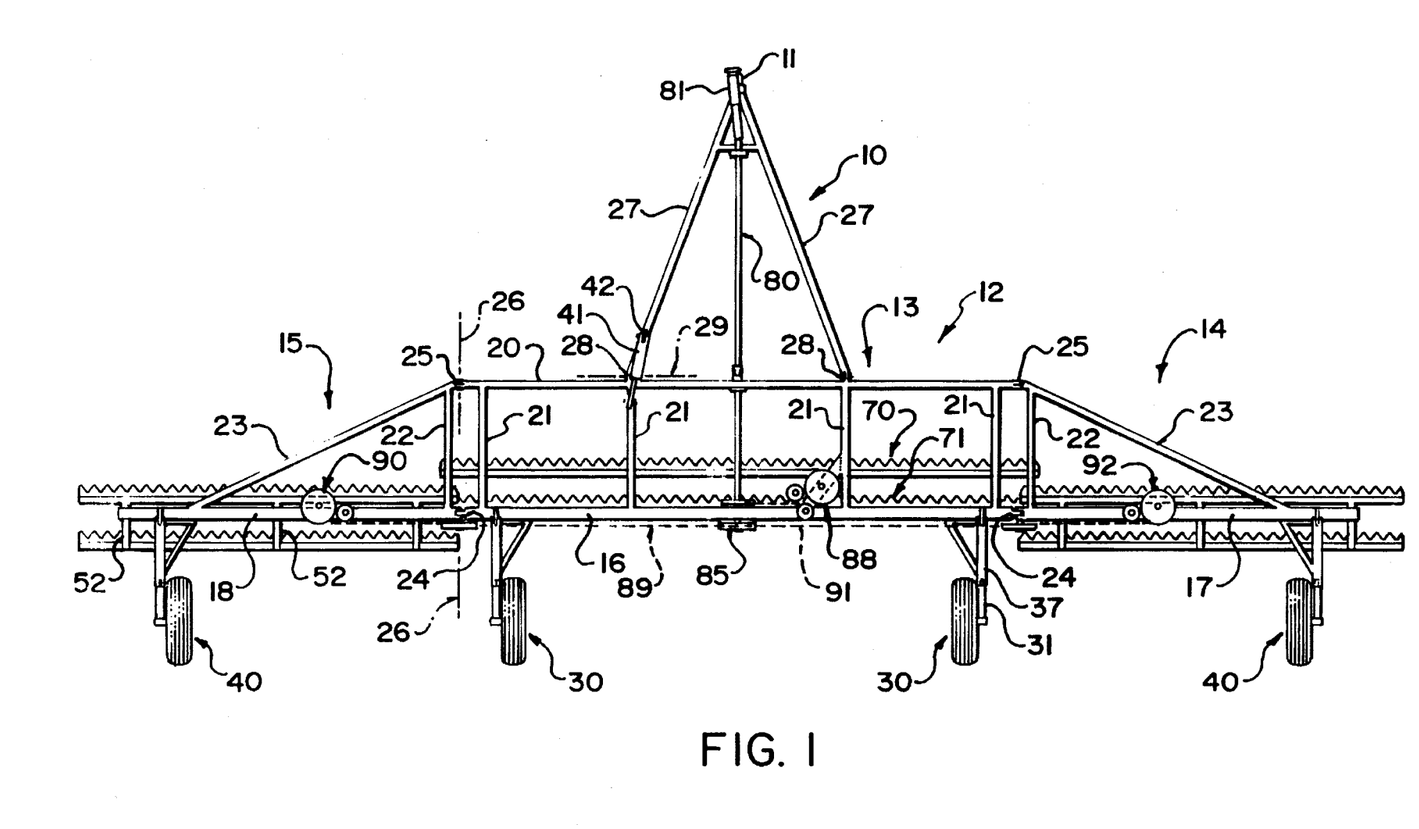
FIG. 1 is a top plan view of the stubble cutter apparatus according to the present invention.

It will be noted from FIGS. 1, 6 and 8 that each cutter knife consists solely of the support tube 60 and the knife mounted on the front face thereof. Thus the cutting system is open between the cutter knives and behind the cutter knives to allow the cut stubble pieces to freely move under their own momentum to a required position and to fall to the ground behind the cutter system. In particular the location of the second cutter knife behind the first cutter knife ensures that the area above the second cutter knife is open and uninterrupted by the support circuit for the first cutter knife so that the stubble pieces are free to move upwardly and rearwardly in an arc without the possibility of impacting support structures and therefore being impeded from a movement in causing blockage. In addition the position of the second cutter knife 71 behind the first cutter knife 70 is such that the remaining stubble portion after the first second stubble piece 73 is cut away is bent forwardly by the cutting action and then is released to spring into the second cutter knife for the cutting action.

As the frame structure and the support for the cutter knives is completely open behind the support tubes 60, the stubble pieces are free to move simply rearwardly after the cutting action so they fall to the ground at a position aligned with the initial stubble piece 72 from which they are cut. Thus there is no transverse movement of the stubble pieces and little or no tendency for the stubble pieces to form windrows or lumps. Thus each standing stubble element 72 is cut into three stubble pieces 73, 74 and 75 which then fall to the ground at a position aligned with the initial standing stubble element. In particular as shown in FIG. 6, the frame structure defined by the leg 51 and the simple horizontal struts 53 and 54 ensures that no element of the support is behind the tubes 60 thus ensuring that there is no possibility of any hang-up of the cut stubble pieces in the frame.

It is highly preferred to attempt, as far as possible, to cut the stubble element 72 into three pieces 73, 74, 75 of equal length. This is achieved by the movement of the beam as previously discussed in which the angle of the beam and the height of the beam can be raised and lowered. In particular the raising of the height of course raises and lowers or second cutting knife 71. The space between the first and second cutting knives is adjusted not by physically moving the cutting knives up and down but instead by twisting the beam 16 which rotates the cutting knives about a horizontal axis longitudinal of the knives so that the effective cutting point of the knife is raised or lowered. At the same time of course this causes a tendency to tilt the knives downwardly toward the ground as shown in FIGS. 10 and 11. In practice the spacing between the cutting knives in the normal or horizontal orientation shown in FIG. 5 is chosen to be of the order of 8 inches which is the maximum allowable length of stubble piece to accommodate subsequent tilling shanks. The system can therefore be set to cut the stubble into three 8 inch pieces by adjusting the height of the beam to leave the standing stubble piece 75 at 8 inches, to cut the second piece 74 at 8 inches and to cut the upper most piece 73 at 8 inches. If the stubble element 72 is of reduced length, this is accommodated by lowering the beam and rotating the beam so that the space between the cutting knives is less than 8 inches and the height of the lower most cutting knife from the ground is less than 8 inches.

The use of the two cutting knives allows the stubble to be cut into three pieces without necessity for providing a piece of the stubble which is going to be longer than approximately 8 inches which is the maximum that can be accommodated by conventional tilling shanks.

As shown in FIG. 1, the sickle knives of the wing sections are off set rearwardly from the sickle knives of the center section so as to allow a slight overlap at the junction between the sections. This effect is achieved by providing different shape of the coupling support 52, 53, 54 so that, while the beams 16, 17 and 18 are aligned, the shape of the coupling support 52, 53, 54 of the center section moves the sickle knives forwardly relative to the sickle knives of the wing sections.

Figure 7:
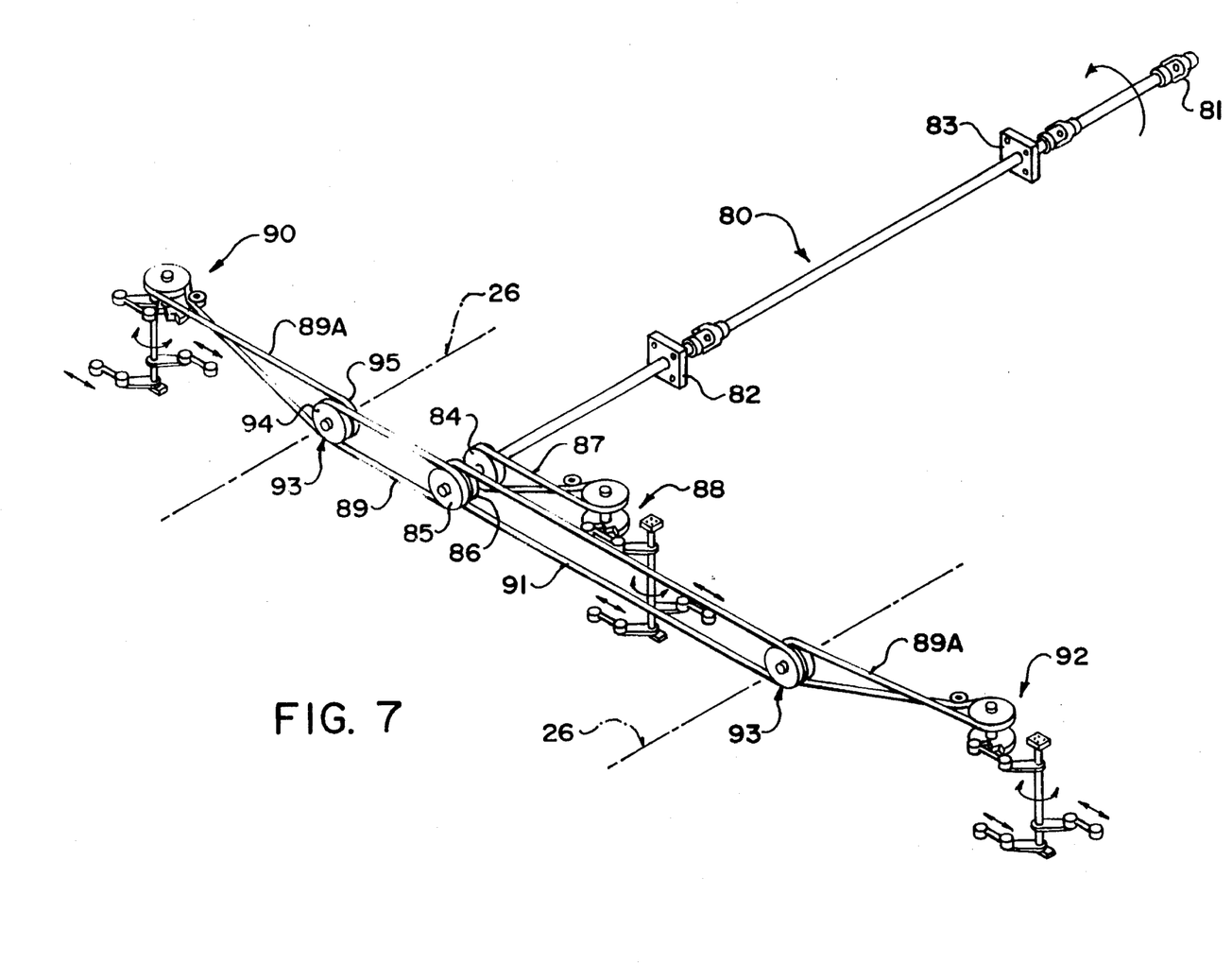
FIG. 7 is an isometric view showing the drive system separately from the remainder of the apparatus.
Figure 8:
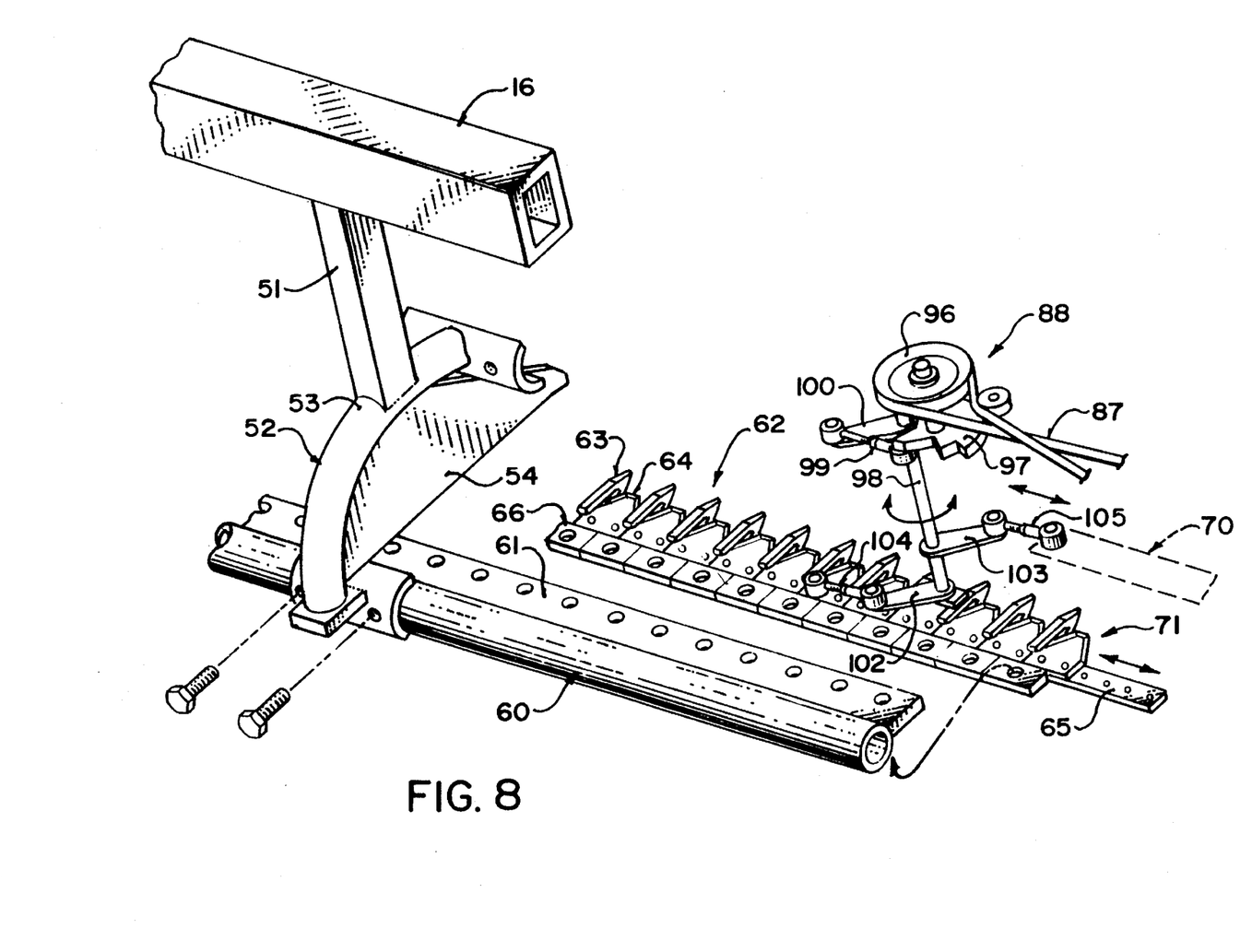
FIG. 8 is an isometric and partly exploded view showing one part only of the frame and the associated drive system.

The drive system is shown in FIGS. 7 and 8 and comprises a drive shaft 80 having a front coupling section 81 for connection to a PTO shaft of the tractor vehicle. The shaft 80 is carried in bearings 82 an d 83 supported on the hitch frame. The shaft 80 drives three pulleys 84, 85 and 86 which are mounted on the shaft for co-rotation therewith. The pulley 84 drives through a belt 87 a drive system 88 for the center section. The pulley 85 drives through a belt 89 a drive system 90 of the wing system 15. The pulley 86 drives through a belt 91 a drive system 92 of the wing system 14.

The belts 89 and 91 are coupled to the respective drive element through an idler shaft 93 and a pair of pulleys 94, 95 mounted on the idler shaft with the idler shaft being located at the axis 26. The second pulley 95 carries a second belt portion 89A which extends from the idler shaft to the drive element 90, 92. The addition of the idler shaft 93 and its associated pulleys at 94, 95 allows the wing section to pivot about the axis 26 without affecting the belts 89, 89A.

One of the drive elements is shown in more detail in FIG. 8 and it being appreciated that each of the drive elements is effectively identical. Each drive element therefore comprises a pulley 96 which drives a counter balanced eccentric 97. The eccentric drives a shaft 98 through a punch rod 99 and crank 100 so that the shaft 98 rotates back and forth about its axis in a reciprocating action. The shaft 98 carries a pair of cranks 102, 103 each of which operates through push rods 104, 105 to drive the cutter knife 70 and 71. It will be noted that the shaft 98 is positioned midway between the knives 70 and 71 so that one crank 103 projects forwardly and the other crank 102 projects rearwardly. This ensures that the cutter knives are driven in opposed phase so that one is moving to the left while the other is moving to the right. The positions of the cutter knives within the knife elements can be centered by adjusting the length of the push rods 104, 105.

The arrangement therefore described above provides an effective machine for cutting the straw into three stubble pieces which can then be discarded onto the ground behind the device without any transverse movement of the stubble pieces. The straw distribution is therefore nearly perfect in that there is no transfer of straw from one part of the field to another part of the field. The cutting of the straw into the three separate pieces leaves the one standing piece which is effective to reduce erosion through wind and water. The two cut pieces which are then discarded onto the ground leave sufficient spaces between the cut pieces to allow for crop germination and for warming of the soil at the end of the winter season.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for cutting stubble comprising a frame having a width defining a working width of the apparatus, a plurality of ground wheels for supporting the frame in movement across ground carrying standing stubble to be cut, a hitch attached to the frame for applying a pulling force from a towing vehicle to the frame in a direction of working movement at right angles to the working width, a first sickle knife, a second sickle knife, a means mounting each of the first and second sickle knives on the frame so that each extends across the full working width, said mounting means mounting the first sickle knife upwardly of and forwardly of the second sickle such that the first sickle knife cuts a first upper stubble piece from the standing stubble as the frame is moved forwardly in the working direction and the second sickle knife cuts a second lower stubble piece from the standing stubble leaving a lower most standing piece, the frame defining an open area behind each of said first and second sickle knives arranged such that the upper stubble and the lower stubble piece fall to the ground behind the first and second sickle knives through the open areas at a position substantially aligned on the ground with the standing stubble piece.

2. The apparatus according to claim 1 wherein the mounting means includes means for adjusting a vertical distance between a point of cutting of the first sickle knife and a point of cutting of the second sickle knife so as to vary the length of the stubble pieces.

3. The apparatus according to claim 2 wherein the mounting means is arranged for adjusting the vertical height of the second sickle knife from the ground.

4. The apparatus according to claim 3 wherein the mounting means includes coupling means interconnecting the first and second sickle knives and holding the first and second sickle knives at a fixed spacing therebetween and means mounting the coupling means for rotation about a horizontal axis at right angles to the working direction and for upward and downward movement of the coupling means.

5. The apparatus according to claim 4 wherein the mounting means includes for each of the sickle knives a bar on which the sickle knife is mounted and wherein the coupling means includes a rigid strut interconnecting the bar of the first sickle knife to the bar of the second sickle knife and a horizontal support bar parallel to the knife bars, each ground wheel including a support strut pivotally connected to the support bar for pivotal movement about horizontal axis adjacent the support bar.

6. The apparatus according to claim 5 including a hydraulic cylinder extending between a first bracket on the strut and a second bracket on the support bar.

7. The apparatus according to claim 4 wherein the hitch is coupled to the frame for pivotal movement about a horizontal axis at right angles to the working direction and wherein there is provided means for adjusting the orientation of the hitch relative to the frame about the horizontal axis.

8. The apparatus according to claim 1 wherein each sickle knife is mounted on a horizontal bar and wherein the frame is open immediately rearwardly of the bar.

9. The apparatus according to claim 1 including means for driving the first and second sickle knives having a drive shaft for connection to a PTO shaft on the vehicle and drive coupling means for coupling from the drive shaft to each of the first and second sickle knives, the drive coupling means being arranged to drive the first and second sickle knives in opposed phase.

10. The apparatus according to claim 9 wherein the drive coupling means comprises a plurality of drive belts.

11. The apparatus according to claim 9 wherein the drive coupling means includes a first and a second tie rod each for connection to the respective one of the sickle knives, at least one of the tie rods being adjustable to effect entering of the sickle knives in opposed phase.

12. The apparatus according to claim 1 wherein the frame includes a center section and a pair of wing sections, each wing section being pivotally mounted on the center section for pivotal movement about a horizontal axis parallel to the working direction so that each wing section can be pivoted to a substantially vertical raised position for transport.

13. The apparatus according to claim 12 including means for driving the first and second sickle knives having a drive shaft for connection to a PTO shaft on the vehicle and drive coupling means for coupling from the drive shaft to each of the first and second sickle knives, the drive coupling means being arranged to drive the first and second sickle knives in opposed phase wherein the drive coupling means comprises a plurality of drive belts, the belt drive means including for each wing section an idler shaft mounted coaxially with the pivot axis of the wing section and a pair of pulleys on the idler shaft, first pulley for receiving from drive belt connected to the center section and the second pulley receiving a drive belt for communicating drive to the wing section.

14. The apparatus according to claim 12 wherein the first and second sickle knives include a center section thereof on the center section of the frame and a wing section thereof on each wing section of the frame, the center section of the sickle knife being arranged to be offset in the direction of working movement relative to the wing sections.

15. The apparatus according to claim 1 wherein the second sickle knife is arranged downwardly and rearwardly of the first sickle knife by a distance such that the stubble when released from the first sickle knife by cutting of the upper stubble piece springs into engagement with the second sickle knife.

* * * * *